United States Patent
Kim et al.

(10) Patent No.: US 7,147,357 B2
(45) Date of Patent: Dec. 12, 2006

(54) BACKLIGHT ASSEMBLY

(75) Inventors: Kyu-seok Kim, Yongin (KR); Jae-ho Jung, Yongin (KR); Sang-duk Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 7 days.

(21) Appl. No.: 10/726,722

(22) Filed: Dec. 3, 2003

(65) Prior Publication Data

US 2004/0246403 A1 Dec. 9, 2004

(30) Foreign Application Priority Data

Dec. 3, 2002 (KR) .................. 10-2002-0076234

(51) Int. Cl.
*F21V 7/04* (2006.01)
(52) U.S. Cl. .................. 362/608; 362/26; 362/609
(58) Field of Classification Search .................. 362/31, 362/600–634, 26; 349/58
See application file for complete search history.

(56) References Cited

U.S. PATENT DOCUMENTS

| | | | | |
|---|---|---|---|---|
| 6,074,070 A | * | 6/2000 | Sasako | 362/31 |
| 6,259,854 B1 | * | 7/2001 | Shinji et al. | 385/146 |
| 6,305,811 B1 | * | 10/2001 | Beeson et al. | 362/626 |
| 6,435,685 B1 | * | 8/2002 | Matsushita | 362/31 |
| 6,443,583 B1 | * | 9/2002 | Ha | 362/31 |
| 6,502,947 B1 | * | 1/2003 | Matsumoto et al. | 362/31 |
| 6,874,902 B1 | * | 4/2005 | Yamashita et al. | 362/620 |

FOREIGN PATENT DOCUMENTS

| | | |
|---|---|---|
| JP | 07036033 | 2/1995 |
| JP | 09197404 | 7/1997 |
| JP | 10319400 | 12/1998 |
| JP | 11052380 | 2/1999 |
| JP | 2001-35232 | 2/2001 |
| JP | 2001100201 | 4/2001 |
| JP | 2002-31798 | 1/2002 |

* cited by examiner

*Primary Examiner*—Sandra O'Shea
*Assistant Examiner*—James W Cranson, Jr.
(74) *Attorney, Agent, or Firm*—Cantor Colburn LLP

(57) ABSTRACT

A backlight assembly for an LCD apparatus comprises a lamp emitting light; a light guide plate including a light-entering surface through which the light from the lamp enters, and a light-emitting surface through which the light is emitted; a lamp reflector having an opening toward the light-entering surface and combined to the light guide plate, accommodating and covering the lamp; and a light interceptive part interposed between the light-emitting surface and the lamp reflector, and preventing the light from the lamp from entering through an edge at which the light-entering surface and the light-emitting surface are intersected. With this configuration, the present invention provides a backlight assembly for an LCD apparatus, which is improved in preventing a bright-line occurring on a front area adjacent to a light-entering surface of a light guide plate and in enhancing the brightness.

15 Claims, 5 Drawing Sheets

BACKLIGHT ASSEMBLY

CROSS-REFERENCE TO RELATED APPLICATIONS

This application claims the benefit of Korean Patent Application No. 2002-76234, filed Dec. 3, 2002, in the Korean Intellectual Property Office, the disclosure of which is incorporated herein by reference.

BACKGROUND OF THE INVENTION

1. Field of the Invention

The present invention relates to a backlight assembly used for an LCD (liquid crystal display) apparatus, and more particularly, to a backlight assembly improved in preventing a bright-line occurring on a front area adjacent to a light-entering surface of a light guide plate and in enhancing the brightness.

2. Description of the Related Art

Generally, an LCD apparatus comprises an LCD panel to display a picture thereon, a backlight assembly to uniformly lighten the LCD panel, and a supporting frame and a chassis to support and accommodate the LCD panel and the backlight assembly.

The LCD panel comprises a TFT (thin film transistor) array substrate formed with switching elements, pixel electrodes, etc., a color filter substrate, and a liquid crystal disposed between the TFT array substrate and the color filter substrate. A video signal is transmitted to transistors of the TFT array substrate via a source PCB (printed circuit board) and a gate PCB. Therefore, the liquid crystal receives an electric current owing to the video signal and displays a picture with the light transmitted through the backlight assembly.

The LCD panel separately needs a light source because it cannot emit light by itself, and therefore the backlight assembly is employed for lightening the LCD panel. The backlight assembly is classified into an edge type and a direct-down type according to location of a lamp.

In the case of the edge type in which the lamp is installed at lateral edges of the light guide plate, the uniformity of the light is high, the life span of the LCD apparatus can be relatively long, and the LCD apparatus can be more slimly manufactured. Further, the edge type backlight assembly is mainly applied to a relatively small LCD apparatus such as monitors of a laptop computer, a desktop computer, etc.

As shown in FIGS. 1 and 2, the conventional backlight assembly 100 comprises a light guide plate 110 converting the light into a surface light source, a lamp unit 120 emitting the light toward the light guide plate 110, a reflector 130 disposed in the rear of the light guide plate 110 and reflecting back the light from the light guide plate 110 into the light guide plate 110, and an optical sheet layer 150 placed in front of the light guide plate 110.

The light guide plate 110 includes a light-entering surface 112 through which the light from the lamp unit 120 enters, and a light-emitting surface 114 through which the light is emitted toward the optical sheet layer 150. On the light guide plate 110 facing the reflector 130 is formed a plurality of prism teeth 110a at intervals of a predetermined pitch, so that the light reflecting from the inside of the light guide plate 110 is uniformly emitted toward the LCD panel (not shown), thereby enhancing the brightness of the LCD apparatus.

The optical sheet layer 150 is placed in front of the light-emitting surface 114 of the light guide plate 110, and includes a reverse prism sheet formed with a plurality of a reverse prism teeth 150a at intervals of a predetermined pitch on the surface facing the light-emitting surface 114. The reverse prism sheet is employed in increasing vertical components of the light emitted toward the LCD panel, thereby enhancing the front brightness of the LCD apparatus.

The lamp unit 120 comprises a lamp 122 facing the light-entering surface 112 of the light guide plate 110 and emitting the light, and a lamp reflector 124 having an opening toward the light-entering surface 122 of the light guide plate 110 and combined to the light guide plate 110, accommodating and covering the lamp 122. The lamp reflector 124 reflects back the light from the lamp 122 into the light guide plate 110.

However, in the conventional backlight assembly 100, there is a problem that a bright-line "A" (refer to FIG. 1) occurs on a front area adjacent to a light-entering surface 112 of the light guide plate 110 because diffusion of the light entering through an edge 118 at which the light-entering surface 112 and the light-emitting surface 114 of the light guide plate 110 are intersected is greater than the diffusion of the light entering through the light-entering surface 112.

SUMMARY OF THE INVENTION

Accordingly, it is an aspect of the present invention to provide a backlight assembly for an LCD apparatus, which is improved in preventing a bright-line occurring on a front area adjacent to a light-entering surface of a light guide plate and in enhancing the brightness.

Additional aspects and advantages of the invention will be set forth in part in the description which follows and, in part, will be obvious form the description, or may be learned by practice of the invention.

The foregoing and other aspects of the present invention are achieved by providing a backlight assembly for an LCD apparatus, which comprises a lamp emitting light; a light guide plate including a light-entering surface through which the light from the lamp enters, and a light-emitting surface through which the light is emitted; a lamp reflector having an opening toward the light-entering surface and combined to the light guide plate, accommodating and covering the lamp; and a light interceptive part interposed between the light-emitting surface and the lamp reflector, and preventing the light from the lamp from entering through an edge at which the light-entering surface and the light-emitting surface are intersected.

According to an aspect of the invention, the light interceptive part is depressed by the edge at which the light-entering surface and the light-emitting surface are intersected.

According to an aspect of the invention, the light interceptive part is made of elastic PET.

According to an aspect of the invention, the light interceptive part is extended toward the lamp beyond the light-entering surface.

According to an aspect of the invention, the light interceptive part has a "⊂"-shaped cross section so as to be fitted on the edge of the lamp reflector.

According to an aspect of the invention, the light interceptive part is printed on a surface of the lamp reflector facing the light-emitting surface.

According to an aspect of the invention, the light interceptive part is black or gray.

According to an aspect of the invention, the backlight assembly further comprises a reflector which is disposed in the rear of the light guide plate, reflects the light into the light guide plate, and extended toward the lamp beyond the light-entering surface.

According to an aspect of the invention, on the light guide plate facing the reflector is formed a plurality of prism teeth at intervals of a predetermined pitch.

According to an aspect of the invention, the backlight assembly further comprises a reverse prism sheet placed in front of the light-emitting surface and formed with a plurality of a reverse prism teeth at intervals of a predetermined pitch on a surface facing the light-emitting surface.

According to an aspect of the invention, at least one side of every reverse prism tooth is convex.

According to an aspect of the invention, the reverse prism teeth are arranged in a direction across the prism teeth of the light guide plate.

According to another aspect of the present invention, the above and/or other aspects may be also achieved by providing a backlight assembly for an LCD apparatus, which comprises a lamp emitting light; a light guide plate including a light-entering surface through which the light from the lamp enters, and a light-emitting surface through which the light is emitted; a lamp reflector having an opening toward the light-entering surface and combined to the light guide plate, accommodating and covering the lamp; and a reverse prism sheet placed in front of the light-emitting surface and formed with a plurality of a reverse prism teeth at intervals of a predetermined pitch on a surface facing the light-emitting surface, wherein at least one side of every reverse prism tooth is convex.

According to an aspect of the invention, on a rear surface of the light guide plate is formed a plurality of prism teeth at intervals of a predetermined pitch.

According to an aspect of the invention, the reverse prism teeth are arranged in a direction across the prism teeth of the light guide plate.

According to an aspect of the invention, the backlight assembly further comprises a light interceptive part interposed between the light-emitting surface and the lamp reflector, and preventing the light from the lamp from entering through an edge at which the light-entering surface and the light-emitting surface are intersected.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
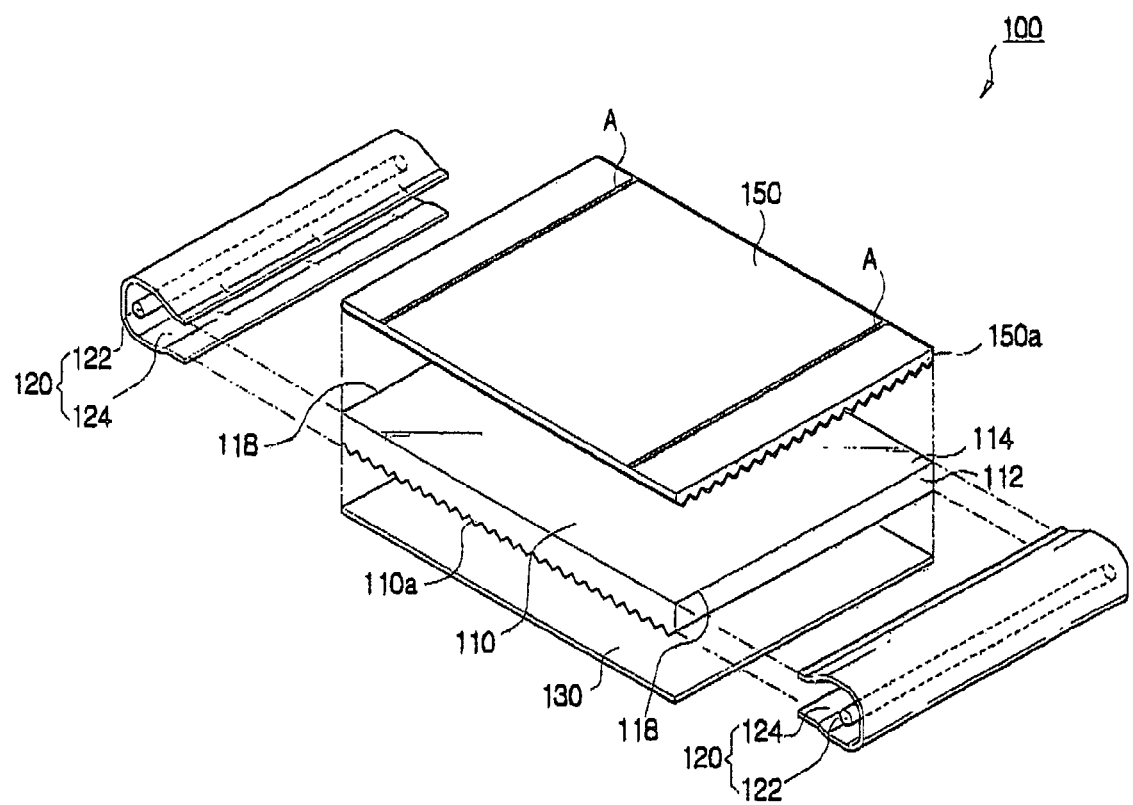
FIG. 1 is an exploded perspective view of a conventional backlight assembly.
Figure 2:
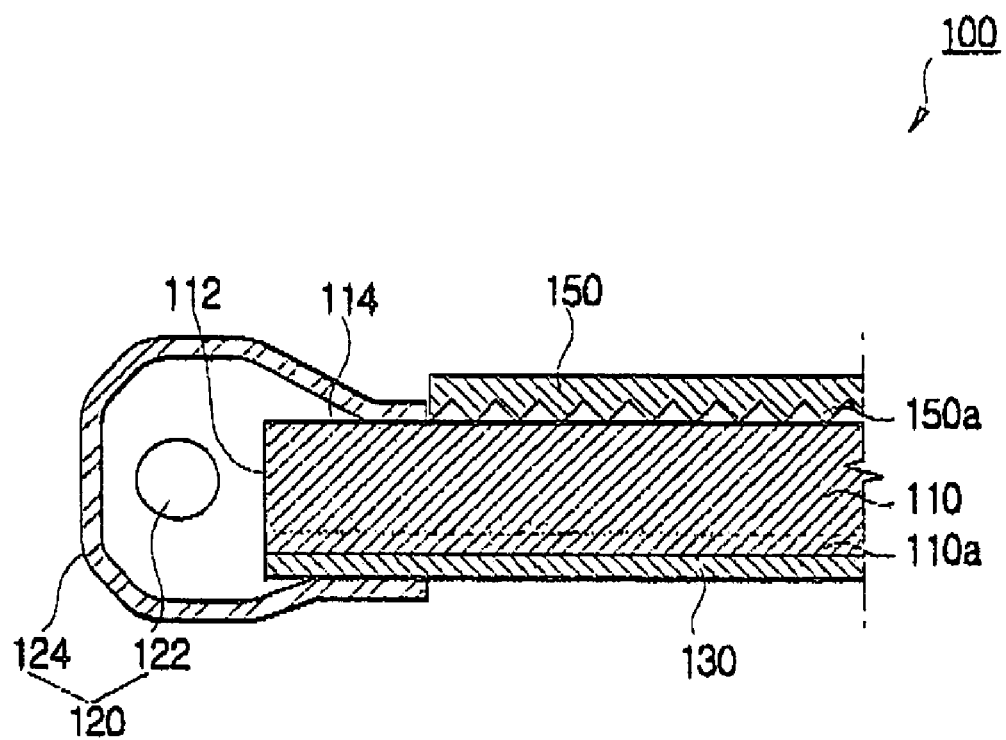
FIG. 2 is a sectional view of the conventional backlight assembly of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Generally, an LCD apparatus comprises an LCD panel to display a picture thereon, a backlight assembly to uniformly lighten the LCD panel, and a supporting frame and a chassis to support and accommodate the LCD panel and the backlight assembly.

The LCD panel comprises a TFT (thin film transistor) array substrate formed with switching elements, pixel electrodes, etc., a color filter substrate, and a liquid crystal filled between the TFT array substrate and the color filter substrate. A video signal is transmitted to transistors of the TFT array substrate via a source PCB (printed circuit board) and a gate PCB. Therefore, the liquid crystal receives an electric current owing to the video signal and displays a picture with the light transmitted through the backlight assembly.

Figure 3:
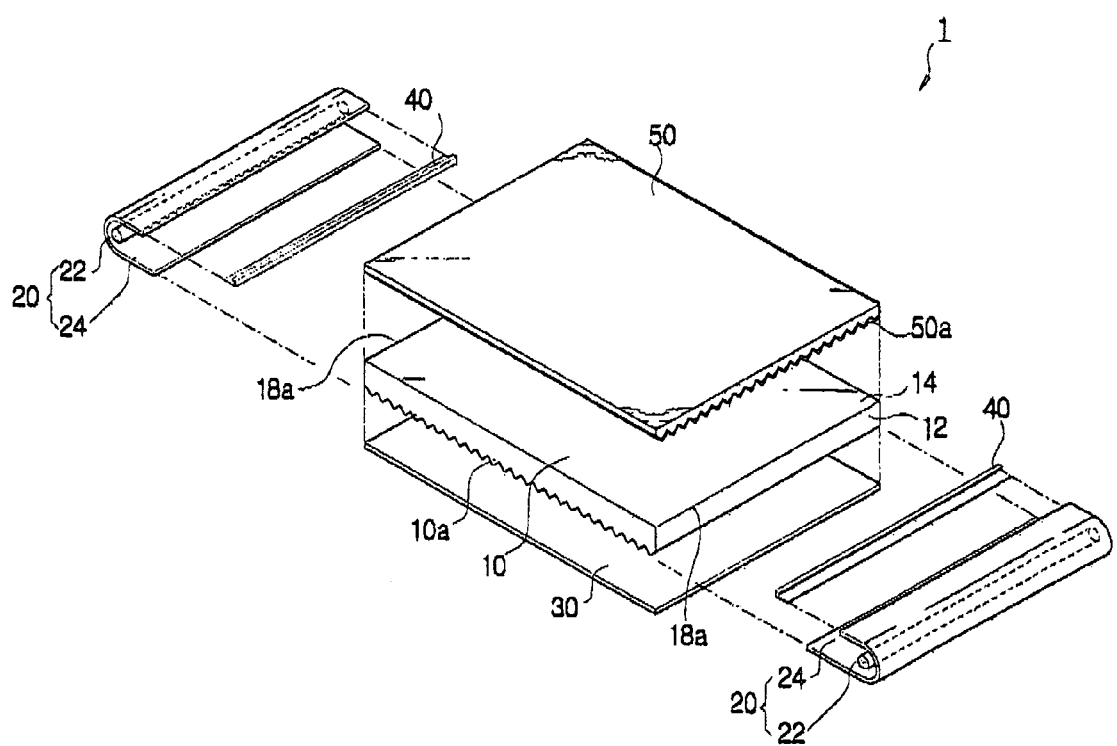
FIG. 3 is an exploded perspective view of a backlight assembly according to one embodiment of the present invention.
Figure 4:
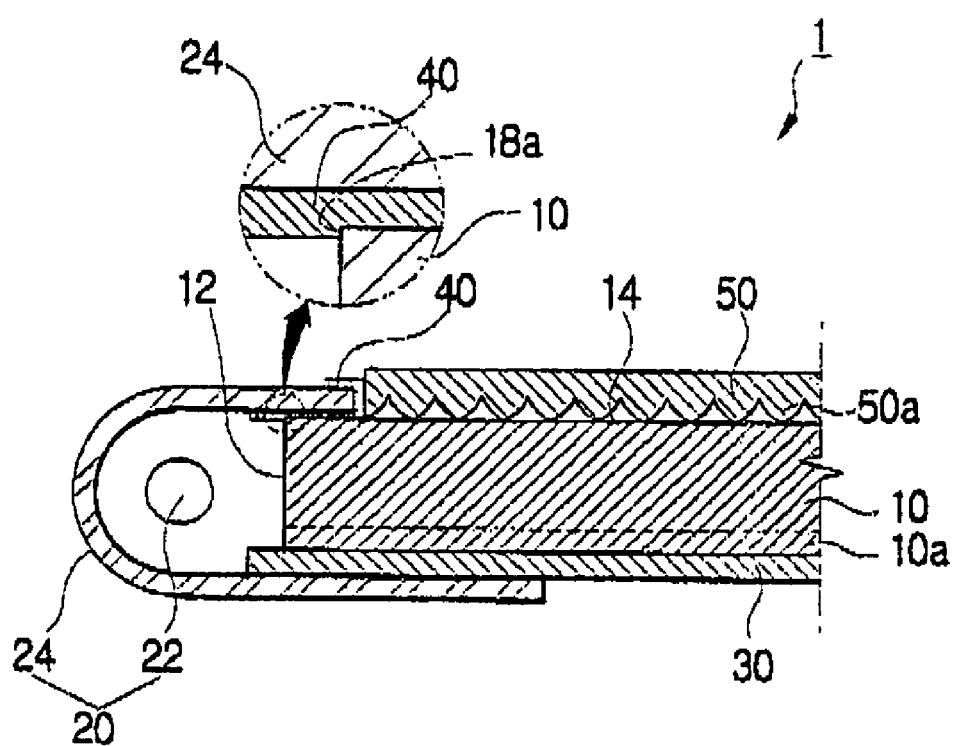
FIG. 4 is a sectional view of the backlight assembly of FIG. 3.

As shown in FIGS. 3 and 4, a backlight assembly 1 according to one embodiment of the present invention comprises a light guide plate 10 converting the light into a surface light source, a lamp unit 20 emitting the light toward the light guide plate 10, a reflector 30 disposed in the rear of the light guide plate 10 and reflecting back the light from the light guide plate 10 into the light guide plate 10, and an optical sheet layer 50 placed in front of the light guide plate 10.

The light guide plate 10 includes a light-entering surface 12 through which the light from the lamp unit 20 enters, and a light-emitting surface 14 through which the light is emitted toward the optical sheet layer 50. The rear surface of the light guide plate 10 facing the reflector 30 is, as shown in FIG. 3, parallel to the front light-emitting surface 14, but may be inclined relative to the front light-emitting surface 14. In the former case, the lamps 22 are provided at both lateral surfaces of the light guide plate, and both the lateral surfaces of the light guide plate 10 are used as the light-entering surfaces 14. In the latter case, only one lamp is provided at the thick lateral surface of the light guide plate, and only the thick lateral surface of the light guide plate is used as the light-entering surface.

The lamp unit 20 comprises a lamp 22 emitting the light, and a lamp reflector 24 having an opening toward the light-entering surface 22 of the light guide plate 10 and combined to the light guide plate 10, accommodating and covering the lamp 22. The lamp reflector 24 reflects back the light from the lamp 22 into the light guide plate 10, thereby decreasing light loss.

Between the light-emitting surface 14 of the light guide plate 10 and the lamp reflector 24 is provided a light interceptive part 40 to prevent the light from the lamp 22 from entering through an edge 18 at which the light-entering surface 12 and the light-emitting surface 14 of the light guide plate 10 are intersected.

The light interceptive part 40 is preferably made of elastic material such as Polyethylene-Terephthalate (hereinafter, referred to as "PET"). The light interceptive part 40 made of the elastic PET is interposed between the light-emitting surface 14 of the light guide plate 10 and the lamp reflector 24, and is slightly depressed by the edge 18a when the light guide plate 10 and the lamp reflector 24 are combined each other, thereby covering the edge 18a at which the light-entering surface 12 and the light-emitting surface 14 are intersected and preventing the light from the lamp 22 from entering through the edge 18a. Thus, a bright-line owing to the light entering through the edge 18a at which the light-entering surface 12 and the light-emitting surface 14 are intersected is prevented from occurring on a front area adjacent to the light-entering surface 12 of the light guide plate 10.

Preferably, the light interceptive part 40 is partially extended toward the lamp 22 beyond the light-entering surface 12. That is, the light interceptive part 40 is interposed between the light-emitting surface 14 of the light guide plate 10 and the lamp reflector 24, being partially extended toward the lamp 22 beyond the light-emitting surface 14. Therefore, the edge 18a of the light guide plate 10 is easily embedded in the light interceptive part 40.

Further, the light interceptive part 40 preferably has a "⊂"-shaped cross section corresponding to an edge of the lamp reflector 24. Therefore, the light interceptive part 40 can be easily installed, being fitted on the edge of the lamp reflector 24.

Figure 5:
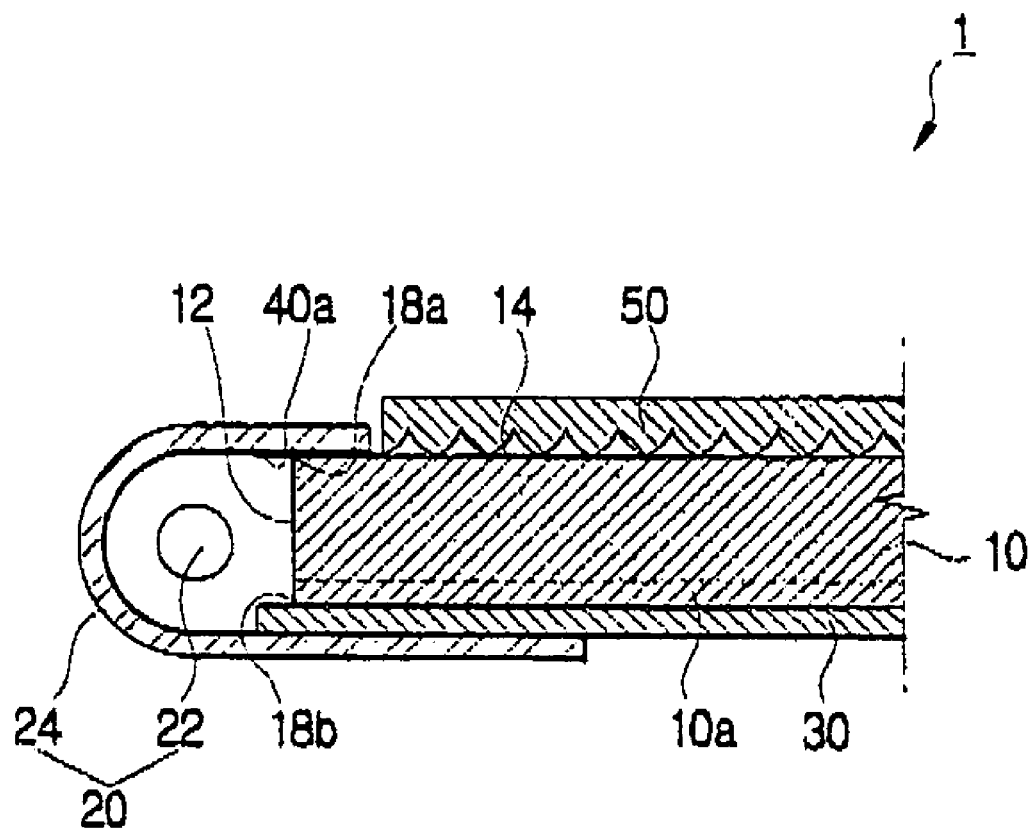
FIG. 5 is an exploded perspective view of a backlight assembly according to another embodiment of the present invention.

On the other hand, as shown in FIG. 5, a light interceptive part 40a according to another embodiment of the present invention can be incorporated with a surface of the lamp reflector 24 facing the light-emitting surface 14. That is, black or gray is painted as the light interceptive part 40a on a surface of the lamp reflector 24 facing the light-emitting surface 14 including the edge 18a of the light guide plate 10, so that the black or the gray absorbs the light emitted toward the edge 18a of the light guide plate 10, thereby intercepting the light entering through the edge 18a of the light guide plate 10. Thus, the bright-line owing to the light entering through the edge 18a of the light guide plate 10 is prevented from occurring on a front area adjacent to the light-entering surface 12 of the light guide plate 10.

The reflector 30 disposed in the rear of the light guide plate 10 reflects back the light from the lamp 22 into the light guide plate 10. The reflector 30 is manufactured by depositing silver (Ag) or applying a white film on the front of a base film made of the PET. Like the light interceptive part 40, the reflector 30 is partially extended toward the lamp 22 beyond the light-entering surface 12. That is, the reflector 30 is partially extended toward the lamp 22 beyond the rear surface of the light guide plate 10. Therefore, the light is prevented from entering through an edge 18b at which the light-entering surface 12 and the rear surface of the light guide plate 10 are intersected.

The optical sheet layer 50 placed in front of the light-emitting surface 14 of light guide plate 10 includes a reverse prism sheet formed with a plurality of a reverse prism teeth 50a at intervals of a predetermined pitch on a surface facing the light-emitting surface 14. Preferably, the reverse prism teeth 50a are arranged in a direction across the prism teeth 10a of the light guide plate 10. Thus, the reverse prism sheet increases vertical components of the light emitted toward the LCD panel, thereby enhancing the front brightness of the LCD apparatus. Additionally, at least one side of every reverse prism tooth 50 is convex, thereby further enhancing the front brightness of the LCD apparatus.

In the above-described embodiment, only the reverse prism sheet was described as one component of the optical sheet layer 50. However, another known optical sheets may be added to the optical sheet layer in order to improve the LCD apparatus in quality.

As described above, the light interceptive part 40 or 40a is interposed between the light-emitting surface 14 of the light guide plate 10 and the lamp reflector 24, and prevents the light from entering through the edge 18a at which the light-entering surface 12 and the light-emitting surface 14 of the light guide plate 10, thereby preventing the bright-line occurring on the front area adjacent to the light-entering surface 12 of the light guide plate 10.

Further, at least one side of every reverse prism tooth 50a, which is formed on the optical sheet layer 50 across the prism tooth 10a of the light guide plate 10, is convex, thereby enhancing the brightness of the LCD apparatus.

As described above, the present invention provides a backlight assembly for an LCD apparatus, which is improved in preventing a bright-line occurring on a front area adjacent to a light-entering surface of a light guide plate and in enhancing the brightness.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A backlight assembly for an LCD apparatus, comprising:
   a lamp emitting light;
   a light guide plate including a light-entering surface through which the light from the lamp enters, and a light-emitting surface trough which the light is emitted;
   a lamp reflector having an opening toward the light-entering surface and combined to the light guide plate, accommodating and coving the lamp; and
   a light interceptive part being separate from the lamp reflector, interposed between the light-emitting surface and the lamp reflector and configured so as to be fitted on the edge of the light reflector, and preventing the light from the lamp from entering through an edge at which the light-entering surface and the light-emitting surface are intersected.

2. The backlight assembly according to claim 1, wherein the light interceptive part is depressed by the edge at which the light-entering surface and the light-emitting surface are intersected.

3. The backlight assembly according to claim 2, wherein the light interceptive part is made of elastic PET.

4. The backlight assembly according to claim 2, wherein the light interceptive part is extended toward the lamp beyond the light-entering surface.

5. The backlight assembly according to claim 4, wherein the light interceptive part has a "C"-shaped cross section.

6. The backlight assembly according to claim 3, wherein the light interceptive part is extended toward the lamp beyond the light-entering surface.

7. The backlight assembly according to claim 6, wherein the light interceptive part has a "C"-shaped cross section.

8. The backlight assembly according to claim 1, wherein the light interceptive part is printed on a surface of the lamp reflector facing the light-emitting surface.

9. The backlight assembly according to claim 8, wherein the light interceptive part is black or gray.

10. The backlight assembly according to claim 1, further comprising a reflector which is disposed in the rear of the light guide plate, reflects the light into the light guide plate, and extended toward the lamp beyond the light-entering surface.

11. The backlight assembly according to claim 10, wherein on the light guide plate facing the reflector is formed a plurality of prism teeth at intervals of a predetermined pitch.

12. The backlight assembly according to claim 11, further comprising a reverse prism sheet placed in front of the light-emit surface and formed with a plurality of a reverse prism teeth at intervals of a predetermined pitch on a surface facing the light-emitting surface.

13. The backlight assembly according to claim 12, wherein at least one side of every reverse prism tooth is convex.

14. The backlight assembly according to clam 12, wherein the reverse prism teeth are arranged in a direction across the prism teeth of the light guide plate.

15. An LCD apparatus comprising an LCD panel to display a picture thereon, and a backlight assembly disposed in a rear of a LCD panel and lightening a LCD panel, wherein the backlight assembly comprises:

a lamp to emit light;

a light guide plate including a light-entering surface through which the light from the lamp enters, and a light-emitting surface through which the light is emitted;

a lamp reflector having an opening toward the light-entering surface and combined to the light guide plate, accommodating and covering the lamp; and a light interceptive part being separate from the lamp reflector, interposed between the light-emitting surface and the lamp reflector, and configured so as to be fitted on the edge of the lamp reflector, and preventing the light from the lamp from entering through an edge at which the light-entering surface and the light-emitting surface are intersected.

* * * * *